US012659878B2

(12) United States Patent
Elshafie et al.

(10) Patent No.: US 12,659,878 B2
(45) Date of Patent: Jun. 16, 2026

(54) POWER HEADROOM REPORTING AND CHANNEL STATE INFORMATION REPORTING FOR ENERGY HARVESTING DEVICES

(71) Applicant: QUALCOMM Incorporated, San Diego, CA (US)

(72) Inventors: Ahmed Elshafie, San Diego, CA (US); Linhai He, San Diego, CA (US); Huilin Xu, Temecula, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 18/156,188

(22) Filed: Jan. 18, 2023

(65) Prior Publication Data

US 2024/0244537 A1      Jul. 18, 2024

(51) Int. Cl.
*H04W 52/36* (2009.01)
*H02J 50/00* (2016.01)
(Continued)

(52) U.S. Cl.
CPC ......... *H04W 52/365* (2013.01); *H02J 50/001* (2020.01); *H02J 50/80* (2016.02); *H04W 52/242* (2013.01)

(58) Field of Classification Search
CPC ............. H04W 52/365; H04W 52/242; H04W 52/146; H04W 52/545; H04W 52/58; H02J 50/001; H02J 50/80
See application file for complete search history.

(56) References Cited

U.S. PATENT DOCUMENTS 11,121,799 B2 *    9/2021   Ahn ........................ H04B 7/088
12,294,956 B2 *    5/2025   Cheng ................. H04W 52/146
(Continued)

OTHER PUBLICATIONS

3GPP TS 38.321: "3rd Generation Partnership Project, Technical Specification Group Radio Access Network, NR, Medium Access Control (MAC) Protocol Specification (Release 17)", 3rd Generation Partnership Project, Mobile Competence Centre, 650, Route Des Lucioles, F-06921 Sophia-Antipolis Cedex, France, vol. RAN WG2, No. V17.3.0, Jan. 13, 2023, XP052235211, Dec. 2022, pp. 1-251, p. 70-73, p. 140, p. 165-169, p. 189, p. 202-211, Power Headroom and CSI Reporting.
(Continued)

*Primary Examiner* — Lewis G West
(74) *Attorney, Agent, or Firm* — Holland & Hart LLP

(57)      ABSTRACT

Methods, systems, and devices for wireless communication are described. An energy harvesting wireless device may accumulate energy during an energy harvesting state for use in subsequent operation. In some cases, the energy harvesting wireless device may detect a trigger, such as a change in an energy status of the energy harvesting wireless device or explicit control signaling from a network, for transmitting a power headroom report (PHR), channel state information (CSI), or both. The energy harvesting wireless device may transmit the message including one or more of the PHR or the CSI and indicating that energy information (e.g., an energy report, an energy request, or both) is multiplexed with the PHR, the CSI, or both. In some cases, the message may include control information such as a medium access control (MAC) control element (MAC-CE).

30 Claims, 12 Drawing Sheets

(51) Int. Cl.
   *H02J 50/80*     (2016.01)
   *H04W 52/24*     (2009.01)

(56)     References Cited

U.S. PATENT DOCUMENTS

| 2012/0329405 | A1* | 12/2012 | Lee ......................... H02J 50/12 |
| | | | 455/73 |
| 2017/0164298 | A1* | 6/2017 | Ryoo .................... H04W 52/34 |
| 2019/0044392 | A1* | 2/2019 | Chowdhury ........... H02J 50/80 |
| 2019/0098586 | A1* | 3/2019 | Akkarakaran ........ H04W 52/42 |
| 2020/0145069 | A1* | 5/2020 | Ferrante .............. H04B 7/0608 |
| 2020/0351931 | A1* | 11/2020 | Babaei ............... H04W 52/365 |
| 2022/0201605 | A1* | 6/2022 | Yang ................. H04W 52/0235 |
| 2022/0338213 | A1* | 10/2022 | Elshafie .............. H04L 5/0094 |
| 2022/0352751 | A1 | 11/2022 | Elshafie et al. |
| 2022/0385104 | A1* | 12/2022 | Elshafie ................. H02J 50/20 |
| 2023/0115600 | A1* | 4/2023 | Stollwerck ............ H01B 17/56 |
| | | | 324/126 |
| 2023/0141393 | A1* | 5/2023 | Elshafie ............... H04W 76/15 |
| | | | 307/104 |
| 2023/0276377 | A1* | 8/2023 | Cirik ................... H04W 52/365 |
| | | | 455/522 |
| 2023/0283442 | A1* | 9/2023 | Wang ..................... H02J 50/20 |
| | | | 370/329 |
| 2023/0409963 | A1* | 12/2023 | Narayanan Thangaraj ................. |
| | | | G06N 3/098 |
| 2024/0056987 | A1* | 2/2024 | Cirik ..................... H04W 52/54 |
| 2024/0114450 | A1* | 4/2024 | Elshafie ........... H04W 52/0216 |
| 2024/0154458 | A1* | 5/2024 | Thuringer ............... H02M 3/07 |
| 2024/0236873 | A1* | 7/2024 | Mallikarjunappa ... H04W 72/12 |
| 2025/0024457 | A1* | 1/2025 | Elshafie ............... H04W 72/23 |
| 2025/0047143 | A1* | 2/2025 | Abotabl ............... H02J 50/001 |
| 2025/0048279 | A1* | 2/2025 | Cirik .................. H04W 52/146 |
| 2025/0096939 | A1* | 3/2025 | Elshafie ............... H04L 1/1893 |

OTHER PUBLICATIONS

International Search Report and Written Opinion—PCT/US2024/010553—ISA/EPO—May 15, 2024.

* cited by examiner

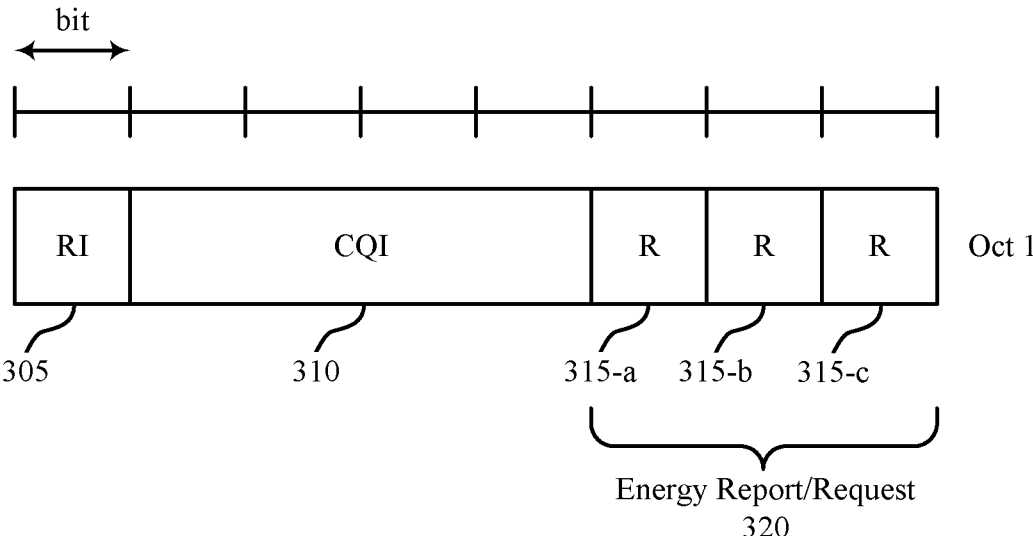
FIG. 3

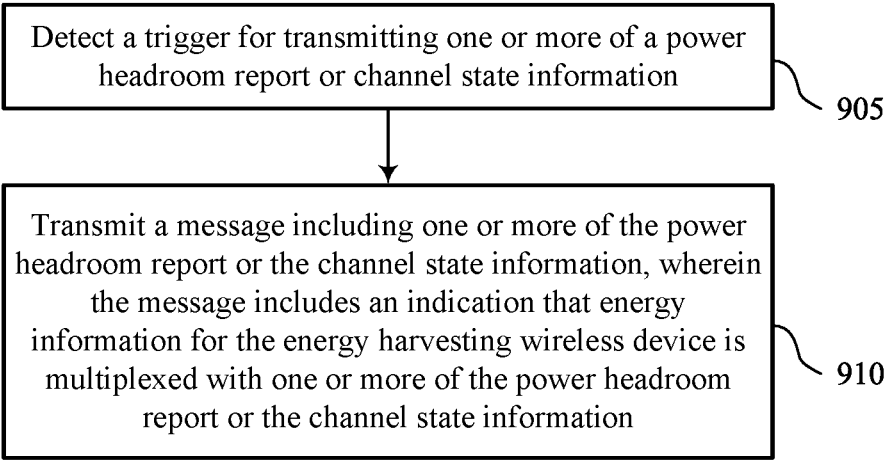

Detect a trigger for transmitting one or more of a power headroom report or channel state information

905

Transmit a message including one or more of the power headroom report or the channel state information, wherein the message includes an indication that energy information for the energy harvesting wireless device is multiplexed with one or more of the power headroom report or the channel state information

910

Detect a trigger for transmitting one or more of a power headroom report or channel state information ⟩ 1005

Transmit, via a message, control information that indicates the power headroom report, wherein one or more reserved bits of the control information indicate a type of the power headroom report ⟩ 1010

1000

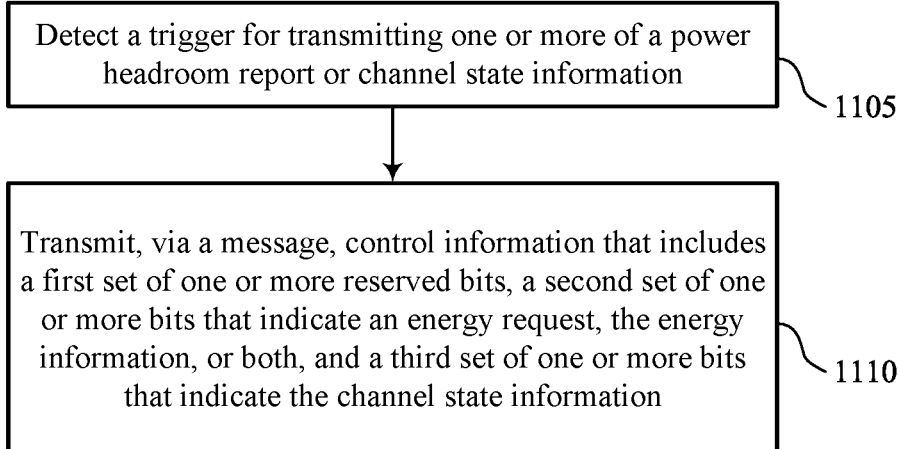

Detect a trigger for transmitting one or more of a power headroom report or channel state information
                                                                    ⟍ 1105

Transmit, via a message, control information that includes a first set of one or more reserved bits, a second set of one or more bits that indicate an energy request, the energy information, or both, and a third set of one or more bits that indicate the channel state information
                                                                    ⟍ 1110

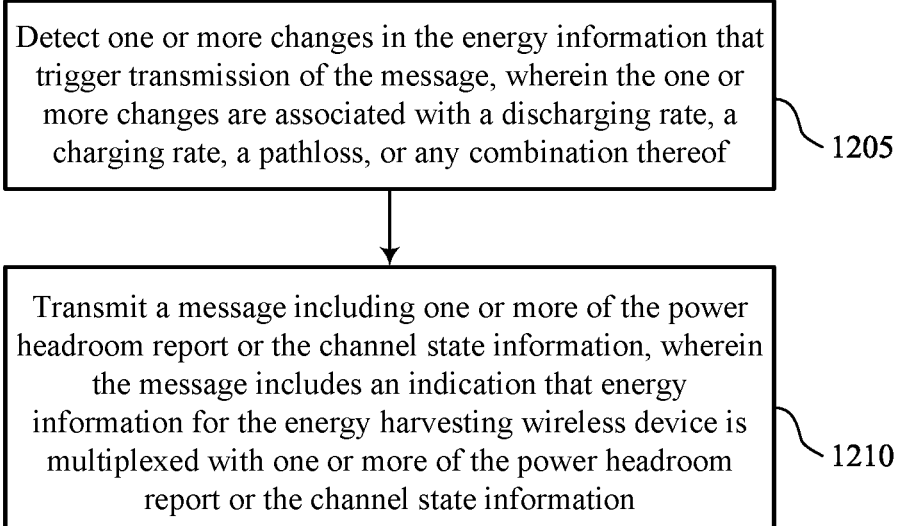

Detect one or more changes in the energy information that trigger transmission of the message, wherein the one or more changes are associated with a discharging rate, a charging rate, a pathloss, or any combination thereof

1205

Transmit a message including one or more of the power headroom report or the channel state information, wherein the message includes an indication that energy information for the energy harvesting wireless device is multiplexed with one or more of the power headroom report or the channel state information

POWER HEADROOM REPORTING AND CHANNEL STATE INFORMATION REPORTING FOR ENERGY HARVESTING DEVICES

TECHNICAL FIELD

The following generally relates to wireless communication, and more specifically power headroom reporting (PHR) and channel state information (CSI) reporting for energy harvesting devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some UEs may include energy harvesting devices that harvest or accumulate energy to perform different communications. In some cases, however, techniques for reporting energy information or requesting information for the energy harvesting device via a power headroom report (PHR) or channel state information (CSI) may be limited.

SUMMARY

The described techniques relate to improved methods, systems, devices, and apparatuses that support power headroom reporting (PHR) and channel state information (CSI) reporting for energy harvesting devices. For example, the described techniques provide for reporting and requesting of energy information using a PHR or CSI. In some examples, an energy harvesting device may detect a trigger for transmitting a PHR, CSI, or both. The trigger may include an energy event, such as a rapid change in an energy charging or discharging rate, or explicit signaling from a network entity. The energy harvesting device may transmit a message including the PHR, the CSI, or both. In some examples, the message may include control information such as a medium access control (MAC) control element (MAC-CE). The message may indicate that energy status information for the energy harvesting device is multiplexed with the PHR, the CSI, or both. That is, the energy harvesting device may report its energy status information with the PHR or CSI, which may increase resource utilization and improve energy efficiency for the energy harvesting device, among other benefits.

A method for wireless communication at an energy harvesting wireless device is described. The method may include detecting a trigger for transmitting one or more of a PHR or CSI and transmitting a message including one or more of the PHR or the CSI, where the message includes an indication that energy information for the energy harvesting wireless device is multiplexed with one or more of the PHR or the CSI.

An apparatus for wireless communication at an energy harvesting wireless device is described. The apparatus may include at least one processor, and memory coupled with the at least one processor, the memory storing instructions for the at least one processor to cause the energy harvesting wireless device to detect a trigger for transmitting one or more of a PHR or CSI and transmit a message including one or more of the PHR or the CSI, where the message includes an indication that energy information for the energy harvesting wireless device is multiplexed with one or more of the PHR or the CSI.

Another apparatus for wireless communication at an energy harvesting wireless device is described. The apparatus may include means for detecting a trigger for transmitting one or more of a PHR or CSI and means for transmitting a message including one or more of the PHR or the CSI, where the message includes an indication that energy information for the energy harvesting wireless device is multiplexed with one or more of the PHR or the CSI.

A non-transitory computer-readable medium storing code for wireless communication at an energy harvesting wireless device is described. The code may include instructions executable by at least one processor to detect a trigger for transmitting one or more of a PHR or CSI and transmit a message including one or more of the PHR or the CSI, where the message includes an indication that energy information for the energy harvesting wireless device is multiplexed with one or more of the PHR or the CSI.

In some examples of the method, apparatuses, and non-transitory computer-readable medium described herein, transmitting the message may include operations, features, means, or instructions for transmitting, via the message, control information that indicates the PHR, where one or more reserved bits of the control information indicate a type of the PHR.

In some examples of the method, apparatuses, and non-transitory computer-readable medium described herein, the control information includes a first set of one or more bits that indicate the PHR and a second set of one or more bits that indicate an energy request, the energy information, or both, where the second set of one or more bits includes the one or more reserved bits.

In some examples of the method, apparatuses, and non-transitory computer-readable medium described herein, a first reserved bit of the one or more reserved bits indicates an energy request and a second reserved bit of the one or more reserved bits indicates the energy information.

In some examples of the method, apparatuses, and non-transitory computer-readable medium described herein, the energy request includes a request for additional energy, and the energy information indicates an energy charging status.

In some examples of the method, apparatuses, and non-transitory computer-readable medium described herein, transmitting the message may include operations, features, means, or instructions for transmitting, via the message, control information that includes a first set of one or more reserved bits, a second set of one or more bits that indicate an energy request, the energy information, or both, and a third set of one or more bits that indicate the PHR.

In some examples of the method, apparatuses, and non-transitory computer-readable medium described herein, transmitting the message may include operations, features, means, or instructions for transmitting, via the message, control information that includes a first set of one or more reserved bits, a second set of one or more bits that indicate an energy request, the energy information, or both, and a third set of one or more bits that indicate the CSI.

In some examples of the method, apparatuses, and non-transitory computer-readable medium described herein, transmitting the message may include operations, features, means, or instructions for transmitting, via the message, control information that indicates the PHR, where a reserved bit of the control information indicates that the energy information may be multiplexed with the PHR.

In some examples of the method, apparatuses, and non-transitory computer-readable medium described herein, transmitting the message may include operations, features, means, or instructions for transmitting, via the message, control information that includes a first set of one or more bits that indicates a rank indicator (RI) associated with the CSI, a second set of one or more bits that indicates a channel quality indicator (CQI) associated with the CSI, and a third set of one or more bits that indicates an energy request, the energy information, or both.

In some examples of the method, apparatuses, and non-transitory computer-readable medium described herein, detecting the trigger may include operations, features, means, or instructions for detecting one or more changes in the energy information that trigger transmission of the message, where the one or more changes may be associated with a discharging rate, a charging rate, a pathloss, or any combination thereof.

In some examples of the method, apparatuses, and non-transitory computer-readable medium described herein, detecting the trigger may include operations, features, means, or instructions for detecting a change in a discharging rate below a threshold value, a change in a charging rate above or below a threshold value, or both, where a pathloss may be unchanged, and where the changes trigger transmission of the message.

In some examples of the method, apparatuses, and non-transitory computer-readable medium described herein, transmitting the message may include operations, features, means, or instructions for transmitting, via the message, the PHR in accordance with a timer.

In some examples of the method, apparatuses, and non-transitory computer-readable medium described herein, detecting the trigger may include operations, features, means, or instructions for receiving control signaling that triggers transmission of the message, where the control signaling indicates to transmit the PHR at a time or during a period of time.

In some examples of the method, apparatuses, and non-transitory computer-readable medium described herein, the energy information includes a charging rate profile, a dis-charging rate profile, an energy level profile, or any com-bination thereof.

In some examples of the method, apparatuses, and non-transitory computer-readable medium described herein, the message includes a MAC-CE that indicates one or more of the PHR or the CSI.

A method for wireless communication at a network entity is described. The method may include transmitting control signaling that triggers transmission of one or more of a PHR or CSI and receiving a message including one or more of the PHR or the CSI, where the message includes an indication that energy information for an energy harvesting wireless device is multiplexed with one or more of the PHR or the CSI.

An apparatus for wireless communication at a network entity is described. The apparatus may include at least one processor, and memory coupled with the at least one pro-cessor, the memory storing instructions for the at least one processor to cause the energy harvesting wireless device to transmit control signaling that triggers transmission of one or more of a PHR or CSI and receive a message including one or more of the PHR or the CSI, where the message includes an indication that energy information for an energy harvesting wireless device is multiplexed with one or more of the PHR or the CSI.

Another apparatus for wireless communication at a net-work entity is described. The apparatus may include means for transmitting control signaling that triggers transmission of one or more of a PHR or CSI and means for receiving a message including one or more of the PHR or the CSI, where the message includes an indication that energy information for an energy harvesting wireless device is multiplexed with one or more of the PHR or the CSI.

A non-transitory computer-readable medium storing code for wireless communication at a network entity is described. The code may include instructions executable by at least one processor to transmit control signaling that triggers trans-mission of one or more of a PHR or CSI and receive a message including one or more of the PHR or the CSI, where the message includes an indication that energy information for an energy harvesting wireless device is multiplexed with one or more of the PHR or the CSI.

In some examples of the method, apparatuses, and non-transitory computer-readable medium described herein, receiving the message may include operations, features, means, or instructions for receiving, via the message, control information that indicates the PHR, where one or more reserved bits of the control information indicate a type of the PHR.

In some examples of the method, apparatuses, and non-transitory computer-readable medium described herein, the control information includes a first set of one or more bits that indicate the PHR and a second set of one or more bits that indicate an energy request, the energy information, or both, where the second set of one or more bits includes the one or more reserved bits.

In some examples of the method, apparatuses, and non-transitory computer-readable medium described herein, a first reserved bit of the one or more reserved bits indicates an energy request and a second reserved bit of the one or more reserved bits indicates the energy information.

In some examples of the method, apparatuses, and non-transitory computer-readable medium described herein, the energy request includes a request for additional energy, and the energy information indicates an energy charging status.

In some examples of the method, apparatuses, and non-transitory computer-readable medium described herein, receiving the message may include operations, features, means, or instructions for receiving, via the message, control information that includes a first set of one or more reserved bits, a second set of one or more bits that indicate an energy request, the energy information, or both, and a third set of one or more bits that indicate the PHR.

In some examples of the method, apparatuses, and non-transitory computer-readable medium described herein, receiving the message may include operations, features, means, or instructions for receiving, via the message, control information that includes a first set of one or more reserved bits, a second set of one or more bits that indicate an energy request, the energy information, or both, and a third set of one or more bits that indicate the CSI.

In some examples of the method, apparatuses, and non-transitory computer-readable medium described herein, receiving the message may include operations, features, means, or instructions for receiving, via the message, control information that indicates the PHR, where a reserved bit of the control information indicates that the energy information may be multiplexed with the PHR.

In some examples of the method, apparatuses, and non-transitory computer-readable medium described herein, receiving the message may include operations, features, means, or instructions for receiving, via the message, control information that includes a first set of one or more bits that indicates an RI associated with the CSI, a second set of one or more bits that indicates a CQI associated with the CSI, and a third set of one or more bits that indicates an energy request, the energy information, or both.

In some examples of the method, apparatuses, and non-transitory computer-readable medium described herein, receiving the message may include operations, features, means, or instructions for receiving, via the message, the PHR in accordance with a timer.

In some examples of the method, apparatuses, and non-transitory computer-readable medium described herein, the control signaling indicates to transmit the PHR at a time or during a period of time.

In some examples of the method, apparatuses, and non-transitory computer-readable medium described herein, the energy information includes a charging rate profile, a dis-charging rate profile, an energy level profile, or any com-bination thereof.

In some examples of the method, apparatuses, and non-transitory computer-readable medium described herein, the message includes a MAC-CE that indicates one or more of the PHR or the CSI.

BRIEF DESCRIPTION OF THE DRAWINGS

FIG. 3 illustrates an example of a medium access control (MAC) control element (MAC-CE) that supports PHR and CSI reporting for energy harvesting devices in accordance with one or more aspects of the present disclosure.

FIGS. 9 through 12 illustrate flowcharts showing methods that PHR and CSI reporting for energy harvesting devices in accordance with one or more aspects of the present disclo-sure.

DETAILED DESCRIPTION

An energy harvesting device may be a wireless device (e.g., a passive user equipment (UE), an Internet of Things (IoT) device, a radio frequency identification (RFID) tag) that operates in various modes or states based on its stored energy. For example, the energy harvesting device may operate in a communication mode, during which the energy harvesting device may perform communications with another wireless device. Alternatively, the energy harvesting device may operate in an energy harvesting mode, in which the energy harvesting device may accumulate or harvest energy. Additionally, the energy harvesting device may request energy to perform particular operations or report its own energy information (e.g., energy status information) to inform other wireless devices of the energy harvesting device's capabilities. For example, the energy harvesting device may report how many transmissions it may be capable of performing given its current energy level, a length of an ON duration it may support given its current energy level, or an energy charging or discharging rate, among other energy information. In some examples, how-ever, methods for reporting such energy information in a power headroom report (PHR) or channel state information (CSI) may be lacking.

The techniques described herein support reporting and requesting of energy information using a PHR or CSI. In some examples, an energy harvesting device may detect a trigger for transmitting a PHR, CSI, or both. The trigger may include an energy event, such as a rapid change in an energy charging or discharging rate, or explicit signaling from a network entity. The energy harvesting device may transmit a message including the PHR, the CSI, or both. In some examples, the message may include control information such as a medium access control (MAC) control element (MAC-CE). The message may indicate that energy status information for the energy harvesting device is multiplexed with the PHR, the CSI, or both. That is, the energy harvest-ing device may report its energy status information with the PHR or CSI, which may increase resource utilization and improve energy efficiency for the energy harvesting device, among other benefits.

Aspects of the disclosure are initially described in the context of wireless communications systems. Aspects of the disclosure are then described in the context of MAC-CEs and process flows. Aspects of the disclosure are further illustrated by and described with reference to apparatus diagrams, system diagrams, and flowcharts that relate to PHR and CSI reporting for energy harvesting devices.

Figure 1:
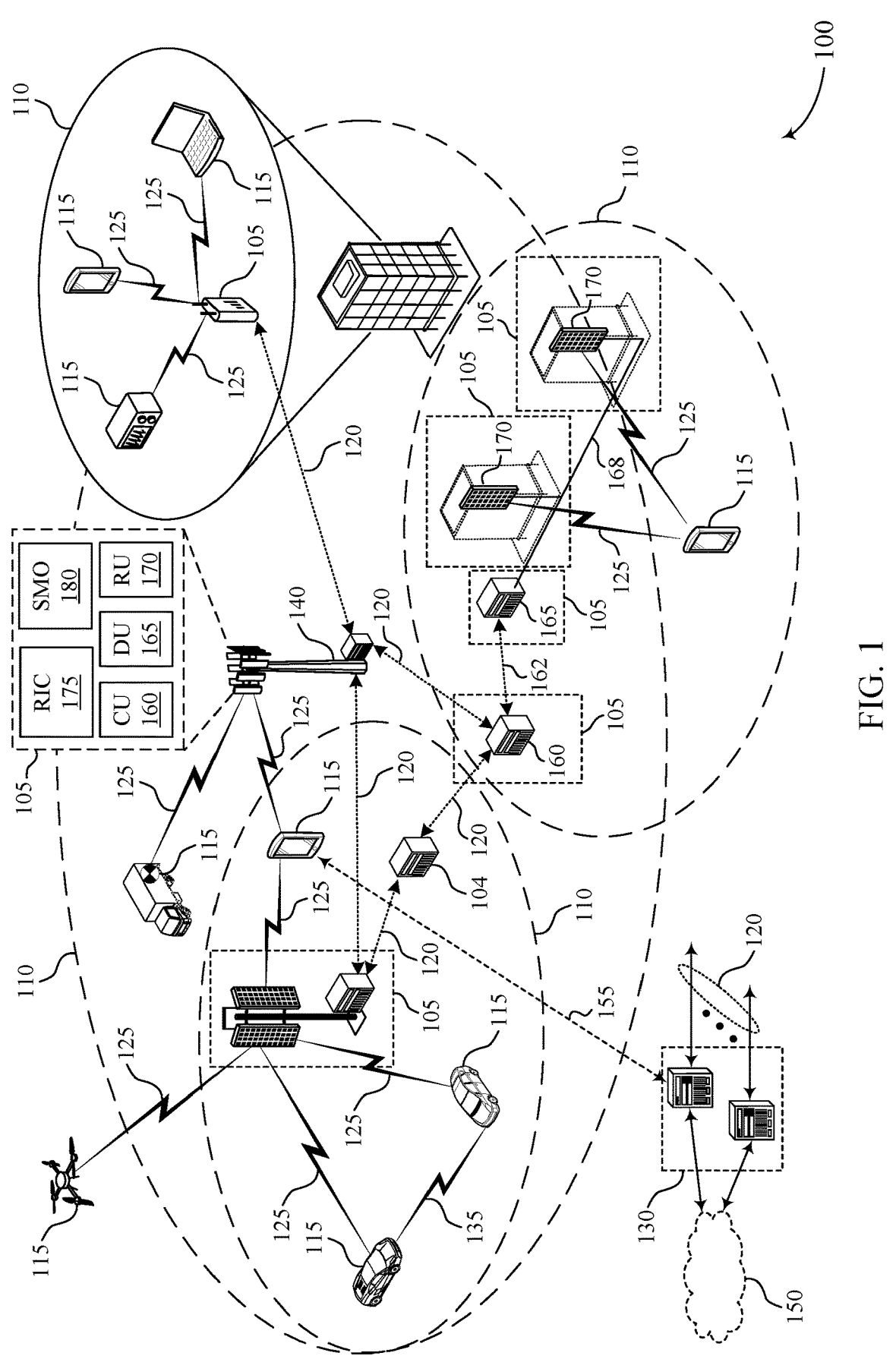
FIG. 1 illustrates an example of a wireless communica-tions system that supports power headroom reporting (PHR) and channel state information (CSI) reporting for energy harvesting devices in accordance with one or more aspects of the present disclosure.

FIG. 1 illustrates an example of a wireless communica-tions system 100 that supports PHR and CSI reporting for energy harvesting devices in accordance with one or more aspects of the present disclosure. The wireless communica-tions system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future sys-tems and radio technologies, including future systems and radio technologies, not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or similar devices may include disclosure of the UE 115, network entity 105, apparatus, device, computing system, or other devices being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support PHR and CSI reporting for energy harvesting devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of TS=1/$(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, and/or electrically) to each other.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 (e.g., an NR wireless communications system) may support reduced capability or low-power wireless devices (e.g., passive wireless devices, metering devices, asset tracking devices, personal IoT or wearable devices) to increase system efficiency, reduce latency, and improve reliability, among other benefits. In some examples, such wireless devices may include energy harvesting devices, which may operate in different states (e.g., modes) such as a communication state, a control signal monitoring and transmission state, a control signal monitoring state, and a charging state. During a charging state, the energy harvesting device may harvest or accumulate energy required to operate or perform subsequent communications. In some cases, the communicate state may include multiple battery states such that the energy harvesting device may receive a particular quantity of signals, X transmissions or transport blocks of a time/frequency configuration (e.g., a defined block of resources) within a period of time $T_{rx}$ or slots, transmit a particular quantity of signals, Y transmissions or transport blocks of a time/frequency configuration (e.g., a defined block of resources) within a period of time $T_{tx}$ or slots with a power of Pt, transmit a particular quantity of signals, Y transmissions or transmit blocks of a particular time/frequency configuration (e.g., a defined block of resources) within a period of time $T_{tx}$ or slots with a power $P_{tx,2}$. In some examples, an energy harvesting device may use a PHR or CSI (e.g., transmitted via a MAC-CE) to communicate energy-related reports or requests in sidelink communications.

In some examples, an energy harvesting device (e.g., a UE 115) may detect a trigger for transmitting one or more of a PHR or CSI (e.g., a CSI report via a MAC-CE). The trigger may include a change in an energy metric (e.g., a sudden change in an energy charging or discharging rate), or explicit signaling from a network entity 105. In some cases, the energy harvesting device may transmit a message including the PHR or the CSI, where the message may further include an indication that energy information for the energy harvesting device is multiplexed with the PHR, the CSI, or both. The message may include control information such as a MAC-CE.

Figure 2:
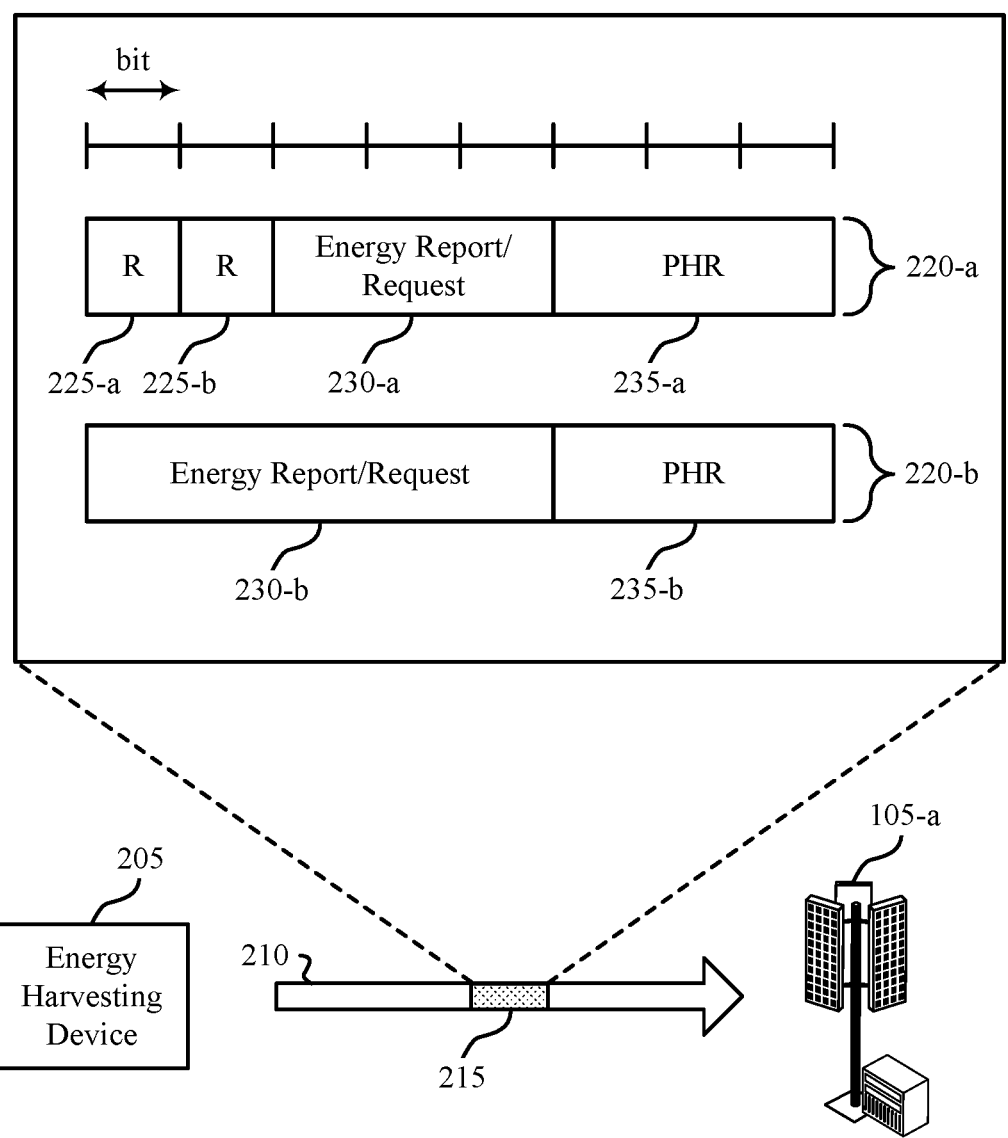
FIG. 2 illustrates an example of a wireless communica-tions system that supports PHR and CSI reporting for energy harvesting devices in accordance with one or more aspects of the present disclosure.

FIG. 2 illustrates an example of a wireless communications system 200 that supports PHR and CSI reporting for energy harvesting devices in accordance with one or more aspects of the present disclosure. In some examples, the wireless communications system 200 may implement aspects of the wireless communications system 100 or may be implemented by aspects of the wireless communications system 100. For example, the wireless communications system 200 may include an energy harvesting device 205

(also referred to herein as an energy harvesting wireless device) and a network entity 105-*a*, which may be examples of corresponding devices described herein. In some examples, the energy harvesting device 205 may include a UE 115 (e.g., a passive UE) or another passive wireless device that may harvest energy to perform communications.

The energy harvesting device 205 may be one of multiple device types. For example, the energy harvesting device 205 may be a passive wireless device that has minimal or no energy storage to power the wireless device or certain wireless components of the energy harvesting device 205. Examples of some such wireless devices may include passive-IoT devices and passive RFID tags. Alternatively, the energy harvesting device 205 may be a semi-passive wireless device, which may have energy storage with or without an amplification component (e.g., a low noise amplifier, a power amplifier). Examples of semi-passive wireless devices may include a semi-passive RFID tag that uses an energy storage unit to power an integrated circuit (IC). Alternatively, the energy harvesting device 205 may be an active wireless device such as a UE 115, which may have energy storage and may generate signals.

The wireless communications system 200 may support communications between the energy harvesting device 205 and the network entity 105-*a*. In some cases, the energy harvesting device 205 may communicate with the network entity 105-*a* via a communication link 210, which may be an example of a communication link 125 described with reference to FIG. 1. In some examples, the energy harvesting device 205 may perform sidelink communications via a sidelink.

In some cases, the energy harvesting device 205 may detect a trigger for transmitting one or more of a PHR 235 or CSI. For example, the energy harvesting device 205 may receive, from the network entity 105-*a*, control signaling that triggers the transmission of the PHR 235, the CSI, or both. The control signaling may include RRC signaling, a MAC-CE, scheduling downlink control information (DCI), or non-scheduling DCI. In some cases, the control signaling may indicate to transmit the PHR 235 at a particular time or during a particular period of time. Additionally, or alternatively, the control signaling may indicate when the energy harvesting device 205 is to transmit a next PHR 235 that may include an energy report, an energy request, or a combination thereof.

Alternatively, the trigger may be based on energy information (e.g., energy status information) associated with the energy harvesting device 205. The energy information may include a charging rate profile, a discharging rate profile, or an energy level profile, among other energy information. Accordingly, the energy harvesting device 205 may be triggered to transmit the PHR 235 or the CSI based on detecting one or more changes in the energy information, where the changes may be associated with a discharging rate, a charging rate, a pathloss, or any combination thereof. For example, the energy harvesting device 205 may detect that a discharging rate has dropped relatively quickly or fallen below a delta value (e.g., measured in decibels (dB)) from a reference value, that a charging rate is above (e.g., Delta_up in dB) or below (e.g., Delta_down in dB) a reference value or threshold, that a pathloss has changed (e.g., dropped by a certain amount beyond an expectation), or any combination thereof. In some examples, the PHR transmission may be triggered if a pathloss remains unchanged, but a charging rate is reduced by a delta value, where a maximum power may have to increase or decrease.

In some examples, the energy harvesting device 205 may lack a large quantity of power levels or granularity and thus, may have very few low power levels. As such, a maximum output or transmit power (PC_Max$_{c,f}$) of the energy harvesting device 205 and the PHR 235 may change. For example, using 64 power levels (e.g., states) may be too many for the capabilities of the energy harvesting device 205, and as such the energy harvesting device 205 may use down sampling (e.g., every other row or every few rows) or specific rows (e.g., low-power levels). In such cases, the message may be a MAC-CE 220-*a* or a MAC-CE 220-*b*, which may include sets of bits used to indicate a PHR 235 (or a PC_Max$_{c,f}$ value) and one or more of an energy report or an energy request (e.g., an energy report/request 230).

The energy harvesting device 205 may transmit a message 215 indicating one or more of the PHR 235 or the CSI in response to detecting the trigger. In some examples, the message 215 may include an indication that the energy information for the energy harvesting device 205 is multiplexed with one or more of the PHR 235 or the CSI. In some examples, the message 215 may be a MAC-CE 220, which may be an example of a power headroom MAC-CE. The energy harvesting device 205 may use a reserved bit 225 (e.g., R=1) to indicate whether the energy information is multiplexed with the PHR 235.

In some examples, a MAC-CE 220-*a* may include eight bits (e.g., an octet). Two bits may be reserved bits 225 (e.g., a reserved bit 225-*a* and a reserved bit 225-*b*) and the remaining six bits may indicate a PHR 235, an energy report/request 230 (e.g., an energy request, an energy report, or both), or a combination thereof. In some cases, an energy request may include a request for the network entity 105-*a* to provide wireless charging or energy (e.g., radio frequency energy, laser energy) to the energy harvesting device 205.

Additionally, or alternatively, in cases where the energy harvesting device 205 relies on other energy harvesting techniques, the energy request may indicate at least one or more energy harvesting durations or one or more energy harvesting configurations. The one or more energy harvesting durations may be included in an energy harvesting profile, the network entity 105-*a* may select an energy harvesting configuration, where more than one energy harvesting configuration may be active at a same time. The energy harvesting durations, the energy harvesting configurations, or both may include times at which the energy harvesting device 205 may be unable to communicate (e.g., receive, transmit, or both) due to frequency tuning (e.g., such that the energy harvesting device 205 is unable to process current cell signals) or due to at least one if a radio frequency, hardware, or software limitation (e.g., the energy harvesting device 205 may receive energy or receive data at any given time). An energy harvesting configuration may be similar to a discontinuous reception (DRX) configuration, which includes an active time for energy harvesting (e.g., a time during which the energy harvesting device 205 may perform energy harvesting) and an off time from energy harvesting (e.g., a time during which the energy harvesting device 205 may refrain from performing energy harvesting).

An energy report may indicate energy information such as a charging rate profile, a discharging rate profile, an energy level profile, or any combination thereof (measured at the energy harvesting device 205). In some examples, the energy report may indicate how many uplink communications (e.g., receptions or transmissions), downlink communications, sidelink communications, or any combination thereof the energy harvesting device 205 may perform given its current stored energy. Additionally, or alternatively, the energy report may indicate how long the energy harvesting device 205 may operate in an ON mode. In some examples, the energy report may indicate a current communication state which may include one of a plurality of communications states that the energy harvesting device 205 and the network entity 105-*a* may agree on. For example, a communication state may include a state defined by receiving or transmitting data, control signaling, or reference signals with a particular quantity of bits, transport block size, power level, or data rate, or any combination thereof. In some cases, the energy report may indicate one or more DRX configurations for receiving data, one or more discontinuous transmission (DTX) configurations for transmitting data, or both. A DTX may be configured if the energy harvesting device 205 uses a separate configuration for receiving and transmitting data. In other cases, the energy harvesting device 205 may use aligned DRX and DTX configurations.

The energy harvesting device 205 may use the reserved bits 225 to indicate what type of information is included in the MAC-CE 220-*a*. In some cases, the reserved bit 225-*a* and the reserved bit 225-*b* may both have a value of 0 (e.g., 00), which may indicate that the MAC-CE 220-*a* includes a legacy PHR (e.g., an indication of a power headroom available for the energy harvesting device 205). Alternatively, the reserved bit 225-*a* may have a value of 0 and the reserved bit 225-*b* may have a value 1 (e.g., 01), which may indicate that the MAC-CE 220-*a* includes a truncated PHR, an energy request (using the bits dedicated for an energy report/request 230-*a*), or both. In such cases, the six bits of the MAC-CE 220 may be divided into a subset of bits for the truncated PHR and a different subset of bits for an energy request. For example, three bits may indicate an energy request and three bits may indicate a PHR 235-*a* (e.g., the truncated PHR) or a PC_Max$_{c,f}$ value for the energy harvesting device 205. In some cases, the truncated PHR may include a limited quantity of entries from a power headroom table (the entries indicating power headroom levels).

Alternatively, the reserved bit 225-*a* may have a value of 1 and the reserved bit 225-*b* may have a value of 0 (e.g., 01), which may indicate that the MAC-CE 220-*a* includes a truncated PHR, an energy report (using the bits dedicated for the energy report/request 230-*a*), or both. That is, the six bits of the MAC-CE 220-*a* may be divided into a subset of bits for the truncated PHR and a different subset of bits for the energy report. For example, three bits may indicate the energy report and three bits may indicate the PHR 235-*a* (e.g., the truncated PHR) or a PC_Max$_{c,f}$ value for the energy harvesting device 205. Alternatively, the reserved bit 225-*a* and the reserved bit 225-*b* may both have a value of 1 (e.g., 11), which may indicate that the bits dedicated to the PHR 235-*a* are unused or are being used for a different energy report type, a different energy request type, or a combination thereof, such that some of the bits may be used for an energy report and remaining bits may be used for an energy request.

In some aspects, the energy harvesting device 205 may use the reserved bits 225 to indicate an energy report/request 230, a PHR 235, or both. For example, the MAC-CE 220-*b* may include three bits (e.g., a first set of one or more bits that indicate a PHR 235-*b*) and five bits (e.g., a second set of one or more bits) that indicate an energy report/request 230-*b*, where the five bits for the energy report/request 230-*b* may include the one or more reserved bits 225. In some examples, a first reserved bit 225 may indicate an energy request and a second reserved bit 225 may indicate the energy report (e.g., the energy information). In such cases, the energy request may include a request for additional energy for the energy harvesting device 205, and the energy report may indicate an energy charging status. For example, the energy report may indicate whether a current charging rate is satisfying a particular input power to an energy harvesting circuit. In some examples, the energy harvesting device 205 may use the two reserved bits 225 jointly to indicate four possible states of an energy request, an energy request, or a combination thereof.

As described herein, the energy harvesting device 205 may transmit a MAC-CE 220 based on a trigger such as a change in an energy status of the energy harvesting device 205, where the energy status may include a discharging rate, a charging rate, a pathloss, or any combination thereof. For example, a condition (e.g., trigger) for transmitting a PHR 235 may be associated with a pathloss change. In some cases, a pathloss change may trigger the energy harvesting device 205 to transmit an energy report/request 230, a PHR 235, or a combination thereof in a MAC-CE 220. For example, the energy harvesting device 205 may be triggered to transmit a MAC-CE 220 including the reserved bits 225 with values 01, 10, or 11 (indicating a PHR 235, an energy report/request 230, or a combination thereof) if one condition is satisfied, where the condition may be a change in a discharging rate, a charging rate, or a pathloss as described herein. If only a PHR condition is triggered, then the reserved bits 225 of the MAC-CE 220 may have values 00 indicating that the MAC-CE 220 includes a PHR 235 (and lacks an energy report/request 230). In some other examples, any MAC-CE 220 may be triggered when any condition is satisfied.

In some cases, the energy harvesting device 205 may use different timers for reporting a PHR 235, an energy report/request 230, or any combination thereof. For example, the energy harvesting device 205 may use a PHR prohibitive timer or a PHR periodicity timer when transmitting a PHR 235. In some examples, the network entity 105-*a* may configure the energy harvesting device 205 with at least one of the PHR prohibitive timer (e.g., prohibitPHRtimer) or the PHR periodicity timer (e.g., periodicPHRtimer) for multiplexing and transmitting the PHR 235 with an energy report, an energy request, or both. In cases where the energy harvesting device 205 transmits an energy report/request 230 without a PHR 235, the energy harvesting device 205 may use the PHR prohibitive timer. As such, the energy harvesting device 205 may adjust what it includes in a MAC-CE 220 based on the PHR prohibitive timer and the PHR periodicity timer, and the energy harvesting device 205 may change conditions of each timer to add energy reports, energy requests, or both to a MAC-CE 220.

In some cases, the energy harvesting device 205 may backscatter (e.g., via a backscatter link) the message 215 including at least one of the PHR 235 or CSI. In some examples, the energy harvesting device 205 may use backscattering in this way if the energy harvesting device 205 is a passive device or an active device, which may have the power to generate the message 215. Alternatively, the energy harvesting device 205 may transmit the message 215 via a channel such as a physical uplink shared channel (PUSCH) or another channel, which may be referred to herein as a link or interface, which may include a sidelink interface, a PC5 interface, or a Uu interface, among other examples.

The energy harvesting device 205 may communicate the message 215 via an interface of the wireless communications system 200 that may include a sinewave (e.g., single-tone) or a multi-tone (e.g., OFDM-based) waveform (e.g., a radio frequency waveform) transmitted by a first device and reflected or backscattered by a second device (e.g., the energy harvesting device 205). The first device may refer to a network unit, an IAB relay, a relay node, a RAN node, a gNB, a TRP associated with the network, a sidelink UE 115 (e.g., remote, primary, PLC, or a controlling unit in sidelink), or a Uu link-UE 115.

The first device may generate a waveform that carries a data signal (e.g., a physical downlink shared channel (PDSCH), a PUSCH, a physical sidelink shared channel (PSSCH), among other examples), a reference signal (e.g., CSI-RS, sounding reference signal (SRS), synchronization signal block (SSB), among other examples), or random data or reference signal symbols across different sub-channels or resource elements. In some examples, the waveform may be a sub-channel-modulated OFDM-based signal or waveform or a time-domain-modulated OFDM-based signal or waveform. Communication signals in such an interface may refer to a modulated waveform or signal that is generated by the energy harvesting device 205 based on a capability of the energy harvesting device 205, where the waveform may be one of a sinewave (e.g., a single-tone wave) or a multi-tone wave (e.g., an OFDM-based waveform).

In some cases, the waveform may be modulated using modulation schemes such as on-off keying (OOK), amplitude-shift keying (ASK), frequency-shift keying (FSK), phase-shift keying (PSK), Zadoff Chu, DFT, Walshi/Hadamard, Gold, Reed-Solomon, m-sequence, or Chirp, among other examples. In some cases, Manchester coding may be used with an ASK or OOK modulation scheme. In some examples, the modulation may occur in a time domain, in a frequency domain, or jointly in both. Additionally, or alternatively, forward error correction codes and other channel coding may be applied to achieve higher reliability.

In some aspects, a wireless device (e.g., a UE 115) may use two different interfaces, where a first interface may be associated with a high-power mode (e.g., with no low-power saving mode). The first interface may be associated with interfaces such as a Uu link or a PC5 link. Alternatively, a second interface may be associated with a same radio as the first interface with one or more deactivated radio frequency, hardware, or software components. In some other cases, the second interface may be associated with a separate radio (e.g., a backscatter-based radio) similar to a passive or semi-passive RFID tag to be used with low-power to very-low power saving modes, where the wireless device may maximize power saving.

In some examples, there may be an association between the interface and a type of signal. For example, if a signal is associated with a low-priority or is less important than data and regular uplink signals (e.g., HARQ-ACK, CSI reports, among other examples), the energy harvesting device 205 may use the second interface. If the signal has a higher importance (e.g., if the signal carries data), the energy harvesting device 205 may use the first interface. In some examples, the network entity 105-*a* may assign different signals to different interfaces based on a priorities of signals, quality-of-service (QoS) requirements, and power saving at the network entity 105-*a* and the energy harvesting device 205, and based on energy information reported at the energy harvesting device 205 (e.g., an energy charging rate profile, an energy discharging rate profile, a power consumption rate profile, an energy state/level profile), or based on preferences of and traffic associated with the energy harvesting device 205. For example, the energy harvesting device 205 may request a particular mapping between signals and interfaces using layer 1 (L1), layer 2 (L2), or layer (L3) signaling that is dedicated signaling or piggybacked or multiplexed with other signals, where the network entity 105-*a* may configure the L1, L2, and L2 signaling, and where the energy harvesting device 205 may transmit UE assistance information (UAI) in the L3 signaling or in RRC signaling.

FIG. 3 illustrates an example of a MAC-CE 300 that supports PHR and CSI reporting for energy harvesting devices in accordance with one or more aspects of the present disclosure. In some examples, the MAC-CE 300 may implement aspects of the wireless communications systems 100 and 200 or may be implemented by aspects of the wireless communications systems 100 and 200. For example, an energy harvesting device may transmit a MAC-CE 300, which may indicate one or more of a PHR or CSI.

In some cases, the MAC-CE 300 may be a sidelink CSI reporting MAC-CE, which may be identified by a MAC subheader with a logical channel identifier (LCID). In addition, the MAC-CE 300 may have a priority fixed to '1.' The MAC-CE 300 may include eight bits (e.g., an octet, Oct 1). A one-bit rank indicator (RI) field 305 of the MAC-CE 300 may indicate a derived value of an RI for sidelink CSI reporting. In addition, the MAC-CE 300 may include a four-bit CQI (CQI) field 310 that may indicate a derived value of a CQI for sidelink CSI reporting. In some cases, the MAC-CE 300 may include one or more reserved bits 315 ("R"), including a reserved bit 315-*a*, a reserved bit 315-*b*, and a reserved bit 315-*c*. In some examples, the reserved bits 315 may each have a value of zero.

In some examples, the MAC-CE 300 may indicate CSI for an energy harvesting device. For example, the energy harvesting device may transmit, via a message, control information such as the MAC-CE 300 that includes a first set of one or more of the reserved bits 315, a second set of one or more bits that indicate an energy report/request 320 (e.g., an energy report, an energy request, or both), and a third set of one or more bits that indicate the CSI. In such cases, the energy request may request energy from a network entity that the energy harvest device may require to operate, and the energy report may indicate energy information such as a charging rate profile, a discharging rate profile, an energy level profile, or a pathloss, among other energy information (measured at the energy harvesting device 205). In this way, the RI field 305 and the CQI field 310 may indicate the CSI, and the reserved bits 315 may indicate an energy report/request 320. In some examples, the energy harvesting device may use fewer bits for the CQI field 310 (e.g., two or three bits) and use the remaining bits for the energy report/request 320.

In some cases, the energy harvesting device may detect a trigger for transmitting the CSI, which may be multiplexed with energy information. The trigger may include control signaling from a network entity or a change in energy information, such as a discharging rate, a charging rate, or a pathloss. In some examples, the three reserved bits 315 may each have a value of 0 or 1 such that the MAC-CE 300 may indicate eight different states of reports (e.g., 000, 001, 010, 100, 111, 110, 101, 011). In addition, the MAC-CE 300 may indicate a CSI report via the RI field 305 and the CQI field 310, where a RI in the RI field 305 may be given as fixed in a CSI trigger, the energy harvesting device computing the CSI assuming that RI. In some cases, the CSI may be associated with a different coding rate, modulation order, or both. For example, the CSI may be associated with a modulation order without coding (e.g., order 2 or 4), such that the CQI field 310 may include only one bit of the MAC-CE 300.

The energy harvesting device may change uses of the RI field 305, the CQI field 310, and the reserved bits 315 based on the energy information associated with the energy harvesting device. For example, PHR tables (e.g., ranges, values, and entries in PHR tables), which may be configured by a network entity, may change a quantity of bits designated for a PHR or the energy report/request 320. Additionally, or alternatively, a quantity of bits in the CQI field 310 may change based on a coding rate, modulation order, or both, where coding may be disabled at any given time. In some examples, an RI may be fixed to one as the energy harvesting device may expect to use one radio frequency chain for communications. In such cases, the energy harvesting device may refrain from using the RI field 305 and instead may use that one-bit field as part of the CQI field 310.

Additionally, or alternatively, a MAC header of the MAC-CE 300 may indicate how many bits may be used to report a PHR or CSI and the energy report/request 320. In addition, the MAC header what information is being reported in the bits (e.g., an energy request, an energy report, or a PHR, or all of these components). In some cases, a full byte or more may be added for at least one of the energy request or the energy report, which may be indicated in the MAC header.

Figure 4:
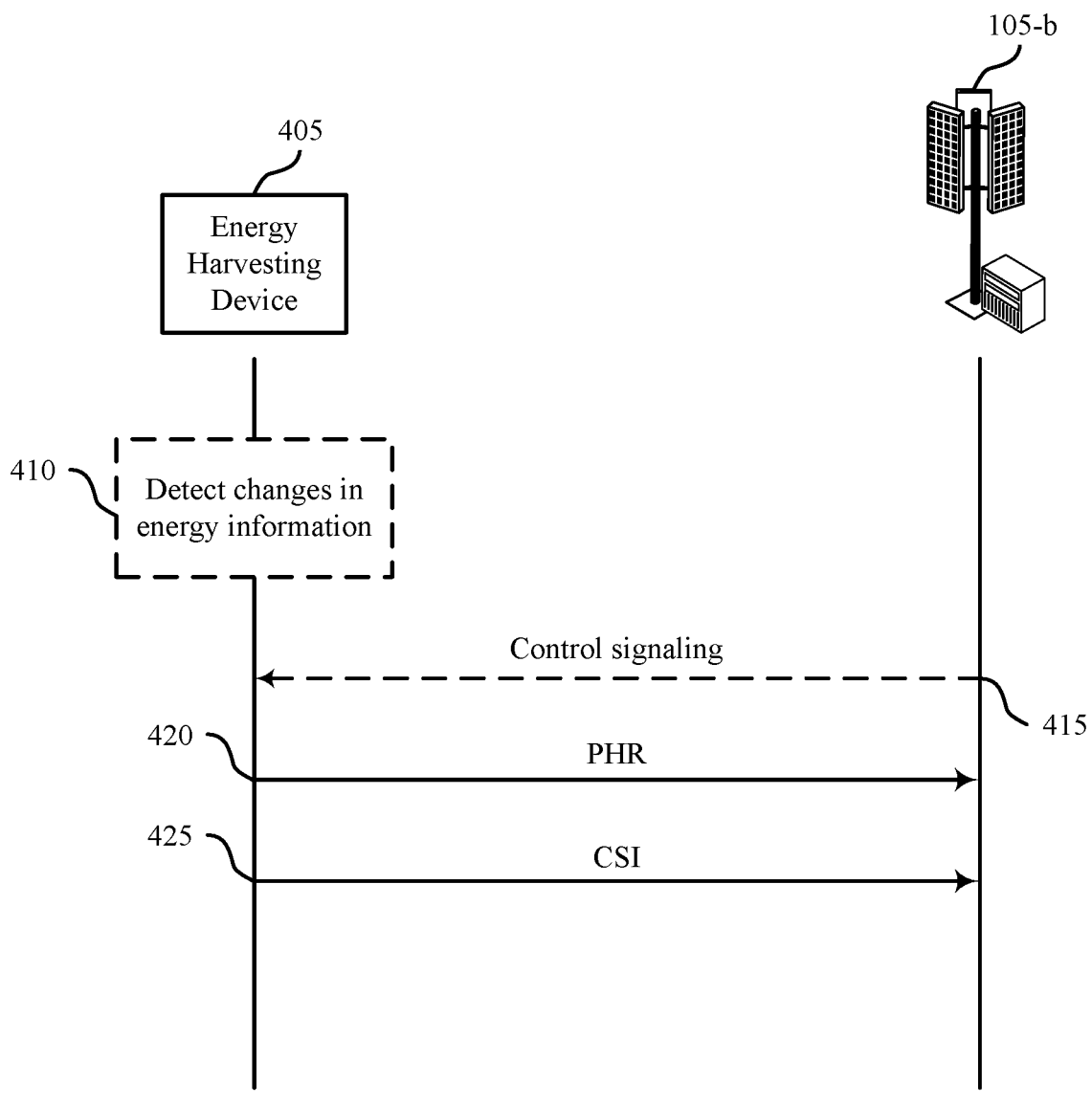
FIG. 4 illustrates an example of a process flow that supports PHR and CSI reporting for energy harvesting devices in accordance with one or more aspects of the present disclosure.

FIG. 4 illustrates an example of a process flow 400 that supports PHR and CSI reporting for energy harvesting devices in accordance with one or more aspects of the present disclosure. The process flow 400 may implement aspects of wireless communications systems 100 and 200, or may be implemented by aspects of the wireless communications systems 100 and 200. For example, the process flow 400 may illustrate operations between an energy harvesting device 405 and a network entity 105-*b*, which may be examples of corresponding devices described herein. In the following description of the process flow 400, the operations between the energy harvesting device 405 and the network entity 105-*b* may be transmitted in a different order than the example order shown, or the operations performed by the energy harvesting device 405 and the network entity 105-*b* may be performed in different orders or at different times. Some operations may also be omitted from the process flow 400, and other operations may be added to the process flow 400.

At 410, the energy harvesting device 405 may detect one or more changes in the energy information that trigger transmission of a message including one or more of a PHR or CSI, where the one or more changes are associated with a discharging rate, a charging rate, a pathloss, or any combination thereof. In some cases, the one or more changes may include a change in a discharging rate below a threshold value, a change in a charging rate above or below a threshold value, or both, where the pathloss may remain unchanged in either case.

At 415, the energy harvesting device 405 may receive control signaling that triggers transmission of the message, where the control signaling may indicate to transmit the PHR at a time or during a period of time. The control signaling may include RRC signaling, a MAC-CE, a scheduling DCI, or a non-scheduling DCI.

At 420 and 425, the energy harvesting device 405 may transmit the message including one or more of the PHR or the CSI, where the message includes an indication that energy information (e.g., an energy report, an energy request, or both) for the energy harvesting device 405 is multiplexed with one or more of the PHR or the CSI. In some cases, the message may include control information such as a MAC-CE, which may include one or more bits used to indicate the energy information and that the energy information is multiplexed with the PHR or the CSI. In some examples, the CSI may include an RI and a CQI.

Figure 5:
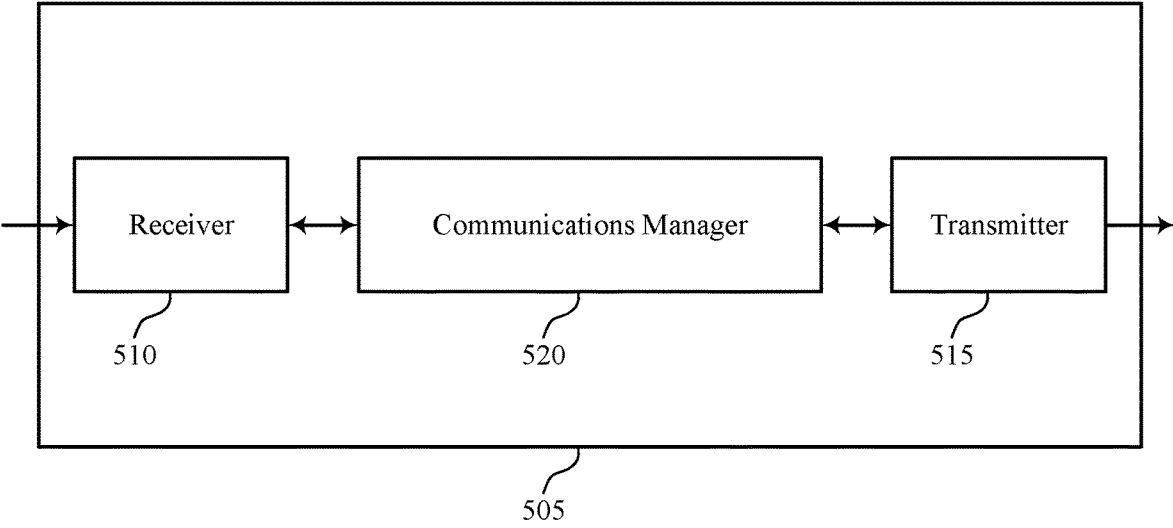
FIGS. 5 and 6 illustrate block diagrams of devices that support PHR and CSI reporting for energy harvesting devices in accordance with one or more aspects of the present disclosure.

FIG. 5 illustrates a block diagram 500 of a device 505 that supports PHR and CSI reporting for energy harvesting devices in accordance with one or more aspects of the present disclosure. The device 505 may be an example of aspects of an energy harvesting wireless device as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to PHR and CSI reporting for energy harvesting devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to PHR and CSI reporting for energy harvesting devices). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of PHR and CSI reporting for energy harvesting devices as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA), or other programmable logic device, a microcontroller, discrete gate or transistor logic, discrete hardware components, or any combination thereof configured as or otherwise supporting a means for performing the functions described in the present disclosure. In some examples, a processor and memory coupled (e.g., operatively, communicatively, functionally, electronically, or electrically) with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in hardware, software (e.g., executed by a processor), or any combination thereof. If implemented in code executed by a processor, the functions of the communications manager 520, the receiver 510, the transmitter 515, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at an energy harvesting wireless device in accordance with examples as disclosed herein. For example, the communications manager 520 may be configured as or otherwise support a means for detecting a trigger for transmitting one or more of a PHR or CSI. The communications manager 520 may be configured as or otherwise support a means for transmitting a message including one or more of the PHR or the CSI, where the message includes an indication that energy information for the energy harvesting wireless device is multiplexed with one or more of the PHR or the CSI.

By including or configuring the communications manager 520 in accordance with examples as described herein, the device 505 (e.g., a processor controlling or otherwise coupled (e.g., operatively, communicatively, functionally, electronically, or electrically) with the receiver 510, the transmitter 515, the communications manager 520, or a combination thereof) may support techniques for transmitting a PHR and CSI for energy harvesting wireless devices, which may increase resource efficiency, decrease power consumption, and improve quality of communications.

Figure 6:
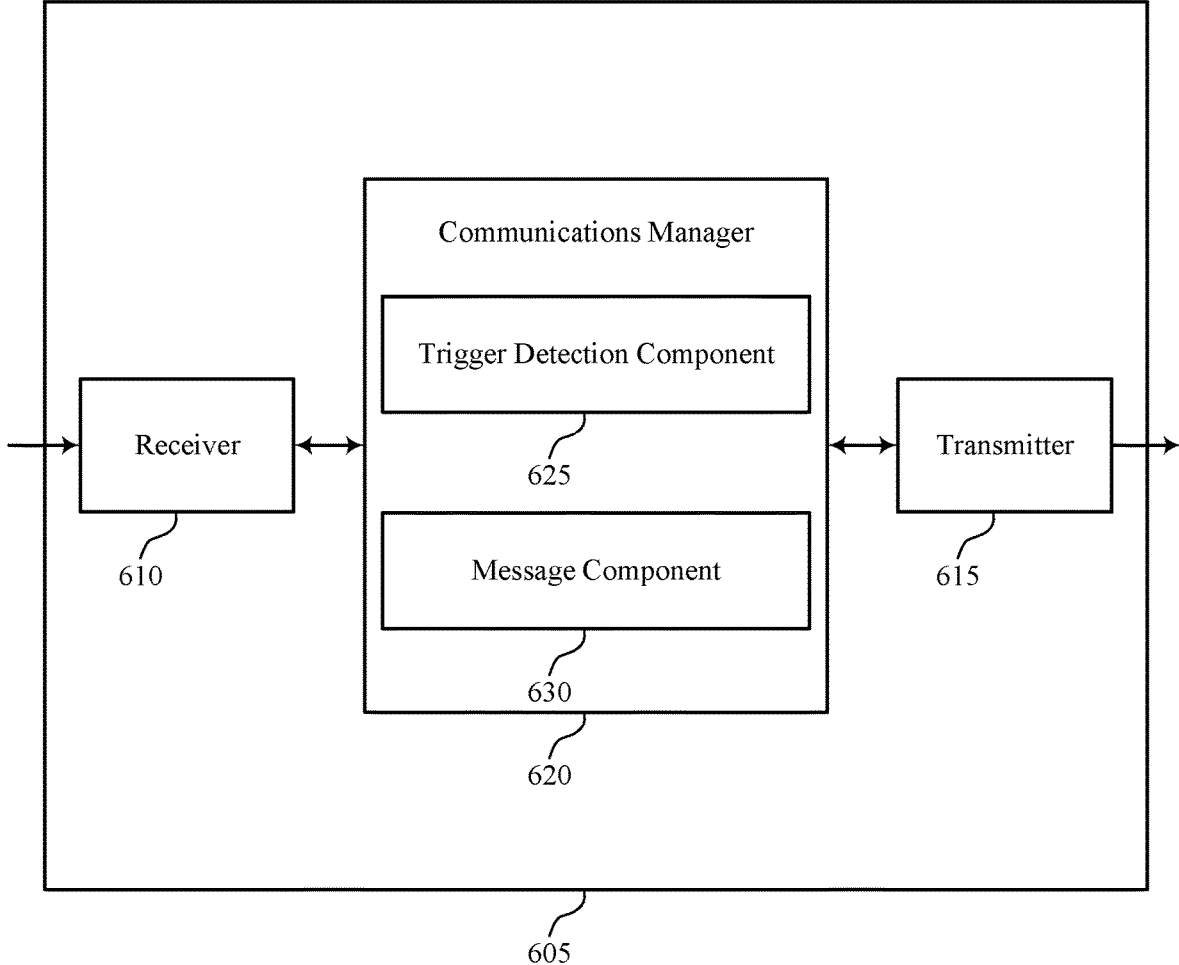

FIG. 6 illustrates a block diagram 600 of a device 605 that supports PHR and CSI reporting for energy harvesting devices in accordance with one or more aspects of the present disclosure. The device 605 may be an example of aspects of a device 505 or an energy harvesting wireless device (e.g., a UE 115 that performs energy harvesting) as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to PHR and CSI reporting for energy harvesting devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to PHR and CSI reporting for energy harvesting devices). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of PHR and CSI reporting for energy harvesting devices as described herein. For example, the communications manager 620 may include a trigger detection component 625 a message component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at an energy harvesting wireless device in accordance with examples as disclosed herein. The trigger detection component 625 may be configured as or otherwise support a means for detecting a trigger for transmitting one or more of a PHR or CSI. The message component 630 may be configured as or otherwise support a means for transmitting a message including one or more of the PHR or the CSI, where the message includes an indication that energy information for the energy harvesting wireless device is multiplexed with one or more of the PHR or the CSI.

Figure 7:
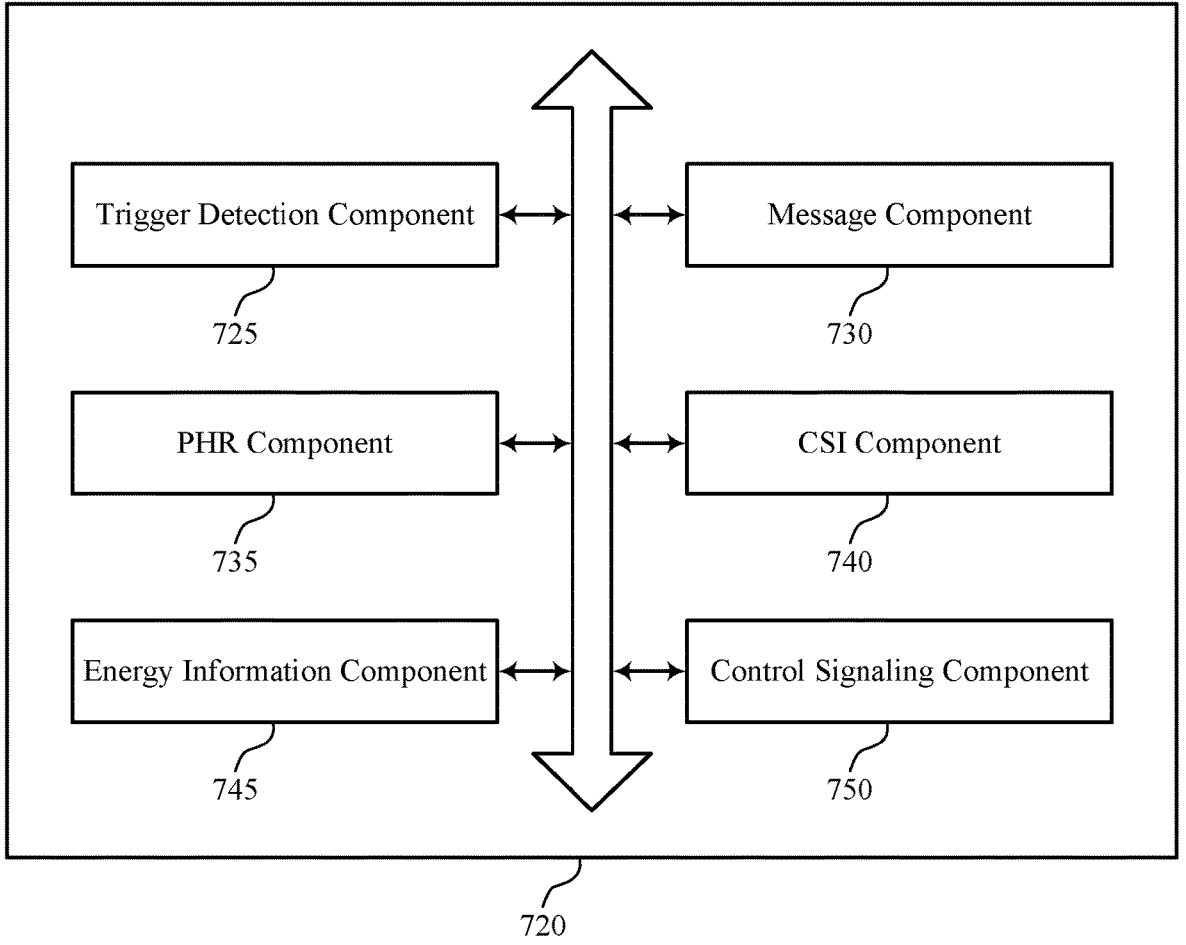
FIG. 7 illustrates a block diagram of a communications manager that supports PHR and CSI reporting for energy harvesting devices in accordance with one or more aspects of the present disclosure.

FIG. 7 illustrates a block diagram 700 of a communications manager 720 that supports PHR and CSI reporting for energy harvesting devices in accordance with one or more aspects of the present disclosure. The communications manager 720 may be an example of aspects of a communications manager 520, a communications manager 620, or both, as described herein. The communications manager 720, or various components thereof, may be an example of means for performing various aspects of PHR and CSI reporting for energy harvesting devices as described herein. For example, the communications manager 720 may include a trigger detection component 725, a message component 730, an PHR component 735, a CSI component 740, an energy information component 745, a control signaling component 750, or any combination thereof. Each of these components may communicate, directly or indirectly, with one another (e.g., via one or more buses).

The communications manager 720 may support wireless communication at an energy harvesting wireless device in accordance with examples as disclosed herein. The trigger detection component 725 may be configured as or otherwise support a means for detecting a trigger for transmitting one or more of a PHR or CSI. The message component 730 may be configured as or otherwise support a means for transmitting a message including one or more of the PHR or the CSI, where the message includes an indication that energy information for the energy harvesting wireless device is multiplexed with one or more of the PHR or the CSI.

In some examples, to support transmitting the message, the PHR component 735 may be configured as or otherwise support a means for transmitting, via the message, control information that indicates the PHR, where one or more reserved bits of the control information indicate a type of the PHR.

In some examples, the control information includes a first set of one or more bits that indicate the PHR and a second set of one or more bits that indicate an energy request, the energy information, or both, where the second set of one or more bits includes the one or more reserved bits.

In some examples, a first reserved bit of the one or more reserved bits indicates an energy request and a second reserved bit of the one or more reserved bits indicates the energy information. In some examples, the energy request includes a request for additional energy, and the energy information indicates an energy charging status.

In some examples, to support transmitting the message, the PHR component 735 may be configured as or otherwise support a means for transmitting, via the message, control information that includes a first set of one or more reserved bits, a second set of one or more bits that indicate an energy request, the energy information, or both, and a third set of one or more bits that indicate the PHR.

In some examples, to support transmitting the message, the CSI component 740 may be configured as or otherwise support a means for transmitting, via the message, control information that includes a first set of one or more reserved bits, a second set of one or more bits that indicate an energy request, the energy information, or both, and a third set of one or more bits that indicate the CSI.

In some examples, to support transmitting the message, the PHR component 735 may be configured as or otherwise support a means for transmitting, via the message, control information that indicates the PHR, where a reserved bit of the control information indicates that the energy information is multiplexed with the PHR.

In some examples, to support transmitting the message, the PHR component 735 may be configured as or otherwise support a means for transmitting, via the message, control information that includes a first set of one or more bits that indicates a RI associated with the CSI, a second set of one or more bits that indicates a CQI associated with the CSI, and a third set of one or more bits that indicates an energy request, the energy information, or both.

In some examples, to support detecting the trigger, the energy information component 745 may be configured as or otherwise support a means for detecting one or more changes in the energy information that trigger transmission of the message, where the one or more changes are associated with a discharging rate, a charging rate, a pathloss, or any combination thereof.

In some examples, to support detecting the trigger, the energy information component 745 may be configured as or otherwise support a means for detecting a change in a discharging rate below a threshold value, a change in a charging rate above or below a threshold value, or both, where a pathloss is unchanged, and where the changes trigger transmission of the message.

In some examples, to support transmitting the message, the PHR component 735 may be configured as or otherwise support a means for transmitting, via the message, the PHR in accordance with a timer.

In some examples, to support detecting the trigger, the control signaling component 750 may be configured as or otherwise support a means for receiving control signaling that triggers transmission of the message, where the control signaling indicates to transmit the PHR at a time or during a period of time.

In some examples, the energy information includes a charging rate profile, a discharging rate profile, an energy level profile, or any combination thereof. In some examples, the message includes a MAC-CE that indicates one or more of the PHR or the CSI.

Figure 8:
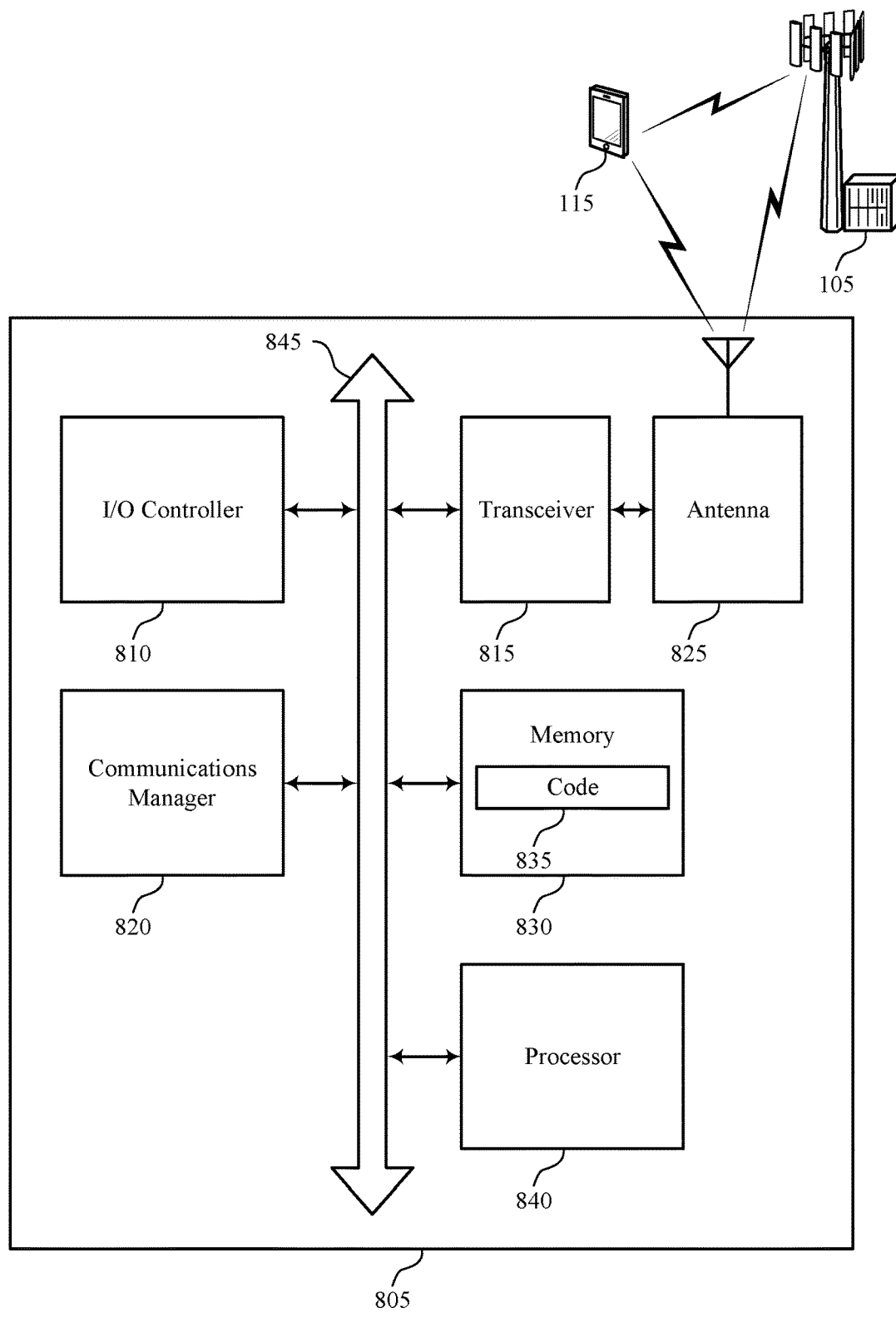
FIG. 8 illustrates a diagram of a system including a device that supports PHR and CSI reporting for energy harvesting devices in accordance with one or more aspects of the present disclosure.

FIG. 8 illustrates a diagram of a system 800 including a device 805 that supports PHR and CSI reporting for energy harvesting devices in accordance with one or more aspects of the present disclosure. The device 805 may be an example of or include the components of a device 505, a device 605, or an energy harvesting wireless device as described herein. The device 805 may include components for bi-directional voice and data communications including components for transmitting and receiving communications, such as a communications manager 820, an I/O controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller.

In some other cases, a memory controller may be integrated into the processor 840. The processor 840 may be configured to execute computer-readable instructions stored in a memory (e.g., the memory 830) to cause the device 805 to perform various functions (e.g., functions or tasks supporting PHR and CSI reporting for energy harvesting devices). For example, the device 805 or a component of the device 805 may include a processor 840 and memory 830 coupled (e.g., operatively, communicatively, functionally, electronically, or electrically) with or to the processor 840, the processor 840 and memory 830 configured to perform various functions described herein.

The communications manager 820 may support wireless communication at an energy harvesting wireless device in accordance with examples as disclosed herein. For example, the communications manager 820 may be configured as or otherwise support a means for detecting a trigger for transmitting one or more of a PHR or CSI. The communications manager 820 may be configured as or otherwise support a means for transmitting a message including one or more of the PHR or the CSI, where the message includes an indication that energy information for the energy harvesting wireless device is multiplexed with one or more of the PHR or the CSI.

By including or configuring the communications manager 820 in accordance with examples as described herein, the device 805 may support techniques for transmitting a PHR and CSI for energy harvesting wireless devices, which may increase resource efficiency, decrease power consumption, and improve quality of communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of PHR and CSI reporting for energy harvesting devices as described herein, or the processor 840 and the memory 830 may be otherwise configured to perform or support such operations.

FIG. 9 illustrates a flowchart showing a method 900 that supports PHR and CSI reporting for energy harvesting devices in accordance with one or more aspects of the present disclosure. The operations of the method 900 may be implemented by an energy harvesting wireless device or its components as described herein. For example, the operations of the method 900 may be performed by an energy harvesting wireless device as described with reference to FIGS. 1 through 8. In some examples, an energy harvesting wireless device may execute a set of instructions to control the functional elements of the energy harvesting wireless device to perform the described functions. Additionally, or alternatively, the energy harvesting wireless device may perform aspects of the described functions using special-purpose hardware.

At 905, the method may include detecting a trigger for transmitting one or more of a PHR or CSI. The operations of 905 may be performed in accordance with examples as disclosed herein. In some examples, aspects of the operations of 905 may be performed by a trigger detection component 725 as described with reference to FIG. 7.

At 910, the method may include transmitting a message including one or more of the PHR or the CSI, wherein the message includes an indication that energy information for the energy harvesting wireless device is multiplexed with one or more of the PHR or the CSI. The operations of 910 may be performed in accordance with examples as disclosed herein. In some examples, aspects of the operations of 910 may be performed by a message component 730 as described with reference to FIG. 7.

Figure 10:
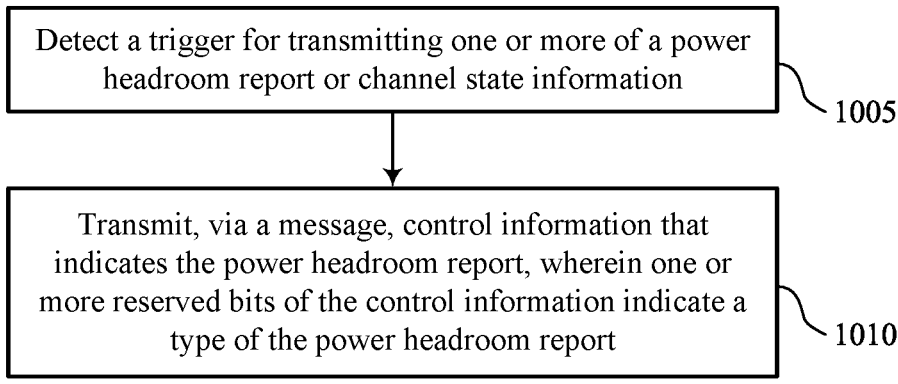

FIG. 10 illustrates a flowchart showing a method 1000 that supports PHR and CSI reporting for energy harvesting devices in accordance with one or more aspects of the present disclosure. The operations of the method 1000 may be implemented by an energy harvesting wireless device or its components as described herein. For example, the operations of the method 1000 may be performed by an energy harvesting wireless device as described with reference to FIGS. 1 through 8. In some examples, an energy harvesting wireless device may execute a set of instructions to control the functional elements of the energy harvesting wireless device to perform the described functions. Additionally, or alternatively, the energy harvesting wireless device may perform aspects of the described functions using special-purpose hardware.

At 1005, the method may include detecting a trigger for transmitting one or more of a PHR or CSI. The operations of 1005 may be performed in accordance with examples as disclosed herein. In some examples, aspects of the operations of 1005 may be performed by a trigger detection component 725 as described with reference to FIG. 7.

At 1010, the method may include transmitting, via the message, control information that indicates the PHR, wherein one or more reserved bits of the control information indicate a type of the PHR. The operations of 1010 may be performed in accordance with examples as disclosed herein. In some examples, aspects of the operations of 1010 may be performed by an PHR component 735 as described with reference to FIG. 7.

FIG. 11 illustrates a flowchart showing a method 1100 that supports PHR and CSI reporting for energy harvesting devices in accordance with one or more aspects of the present disclosure. The operations of the method 1100 may be implemented by an energy harvesting wireless device or its components as described herein. For example, the operations of the method 1100 may be performed by an energy harvesting wireless device as described with reference to FIGS. 1 through 8. In some examples, an energy harvesting wireless device may execute a set of instructions to control the functional elements of the energy harvesting wireless device to perform the described functions. Additionally, or alternatively, the energy harvesting wireless device may perform aspects of the described functions using special-purpose hardware.

At 1105, the method may include detecting a trigger for transmitting one or more of a PHR or CSI. The operations of 1105 may be performed in accordance with examples as disclosed herein. In some examples, aspects of the operations of 1105 may be performed by a trigger detection component 725 as described with reference to FIG. 7.

At 1110, the method may include transmitting, via the message, control information that includes a first set of one or more reserved bits, a second set of one or more bits that indicate an energy request, the energy information, or both, and a third set of one or more bits that indicate the CSI. The operations of 1110 may be performed in accordance with examples as disclosed herein. In some examples, aspects of the operations of 1110 may be performed by a CSI component 740 as described with reference to FIG. 7.

FIG. 12 illustrates a flowchart showing a method 1200 that supports PHR and CSI reporting for energy harvesting devices in accordance with one or more aspects of the present disclosure. The operations of the method 1200 may be implemented by an energy harvesting wireless device or its components as described herein. For example, the operations of the method 1200 may be performed by an energy harvesting wireless device as described with reference to FIGS. 1 through 8. In some examples, an energy harvesting wireless device may execute a set of instructions to control the functional elements of the energy harvesting wireless device to perform the described functions. Additionally, or alternatively, the energy harvesting wireless device may perform aspects of the described functions using special-purpose hardware.

At 1205, the method may include detecting one or more changes in the energy information that trigger transmission of the message, wherein the one or more changes are associated with a discharging rate, a charging rate, a pathloss, or any combination thereof. The operations of 1205 may be performed in accordance with examples as disclosed herein. In some examples, aspects of the operations of 1205 may be performed by an energy information component 745 as described with reference to FIG. 7.

At 1210, the method may include transmitting a message including one or more of the PHR or the CSI, wherein the message includes an indication that energy information for the energy harvesting wireless device is multiplexed with one or more of the PHR or the CSI. The operations of 1210 may be performed in accordance with examples as disclosed herein. In some examples, aspects of the operations of 1210 may be performed by a message component 730 as described with reference to FIG. 7.

The following provides an overview of aspects of the present disclosure:

Aspect 1: A method for wireless communication at an energy harvesting wireless device, comprising: detecting a trigger for transmitting one or more of a PHR or CSI; and transmitting a message comprising one or more of the PHR or the CSI, wherein the message comprises an indication that energy information for the energy harvesting wireless device is multiplexed with one or more of the PHR or the CSI.

Aspect 2: The method of aspect 1, wherein transmitting the message comprises: transmitting, via the message, control information that indicates the PHR, wherein one or more reserved bits of the control information indicate a type of the PHR.

Aspect 3: The method of aspect 2, wherein the control information comprises a first set of one or more bits that indicate the PHR and a second set of one or more bits that indicate an energy request, the energy information, or both, wherein the second set of one or more bits comprises the one or more reserved bits.

Aspect 4: The method of any of aspects 2 through 3, wherein a first reserved bit of the one or more reserved bits indicates an energy request and a second reserved bit of the one or more reserved bits indicates the energy information.

Aspect 5: The method of aspect 4, wherein the energy request comprises a request for additional energy, and the energy information indicates an energy charging status.

Aspect 6: The method of any of aspects 1 through 5, wherein transmitting the message comprises: transmitting, via the message, control information that comprises a first set of one or more reserved bits, a second set of one or more bits that indicate an energy request, the energy information, or both, and a third set of one or more bits that indicate the PHR.

Aspect 7: The method of any of aspects 1 through 6, wherein transmitting the message comprises: transmitting, via the message, control information that comprises a first set of one or more reserved bits, a second set of one or more bits that indicate an energy request, the energy information, or both, and a third set of one or more bits that indicate the CSI.

Aspect 8: The method of any of aspects 1 through 7, wherein transmitting the message comprises: transmitting, via the message, control information that indicates the PHR, wherein a reserved bit of the control information indicates that the energy information is multiplexed with the PHR.

Aspect 9: The method of any of aspects 1 through 8, wherein transmitting the message comprises: transmitting, via the message, control information that comprises a first set of one or more bits that indicates an RI associated with the CSI, a second set of one or more bits that indicates a CQI associated with the CSI, and a third set of one or more bits that indicates an energy request, the energy information, or both.

Aspect 10: The method of any of aspects 1 through 9, wherein detecting the trigger comprises: detecting one or more changes in the energy information that trigger transmission of the message, wherein the one or more changes are associated with a discharging rate, a charging rate, a pathloss, or any combination thereof.

Aspect 11: The method of any of aspects 1 through 10, wherein detecting the trigger comprises: detecting a change in a discharging rate below a threshold value, a change in a charging rate above or below a threshold value, or both, wherein a pathloss is unchanged, and wherein the changes trigger transmission of the message.

Aspect 12: The method of any of aspects 1 through 11, wherein transmitting the message comprises: transmitting, via the message, the PHR in accordance with a timer.

Aspect 13: The method of any of aspects 1 through 12, wherein detecting the trigger comprises: receiving control signaling that triggers transmission of the message, wherein the control signaling indicates to transmit the PHR at a time or during a period of time.

Aspect 14: The method of any of aspects 1 through 13, wherein the energy information comprises a charging rate profile, a discharging rate profile, an energy level profile, or any combination thereof.

Aspect 15: The method of any of aspects 1 through 14, wherein the message comprises a MAC-CE that indicates one or more of the PHR or the CSI.

Aspect 16: A method for wireless communication at a network entity, comprising: transmitting control signaling that triggers transmission of one or more of a PHR or CSI; and receiving a message comprising one or more of the PHR or the CSI, wherein the message comprises an indication that energy information for an energy harvesting wireless device is multiplexed with one or more of the PHR or the CSI.

Aspect 17: The method of aspect 16, wherein receiving the message comprises: receiving, via the message, control information that indicates the PHR, wherein one or more reserved bits of the control information indicate a type of the PHR.

Aspect 18: The method of aspect 17, wherein the control information comprises a first set of one or more bits that indicate the PHR and a second set of one or more bits that indicate an energy request, the energy information, or both, wherein the second set of one or more bits comprises the one or more reserved bits.

Aspect 19: The method of any of aspects 17 through 18, wherein a first reserved bit of the one or more reserved bits indicates an energy request and a second reserved bit of the one or more reserved bits indicates the energy information.

Aspect 20: The method of aspect 19, wherein the energy request comprises a request for additional energy, and the energy information indicates an energy charging status.

Aspect 21: The method of any of aspects 16 through 20, wherein receiving the message comprises: receiving, via the message, control information that comprises a first set of one or more reserved bits, a second set of one or more bits that indicate an energy request, the energy information, or both, and a third set of one or more bits that indicate the PHR.

Aspect 22: The method of any of aspects 16 through 21, wherein receiving the message comprises: receiving, via the message, control information that comprises a first set of one or more reserved bits, a second set of one or more bits that indicate an energy request, the energy information, or both, and a third set of one or more bits that indicate the CSI.

Aspect 23: The method of any of aspects 16 through 22, wherein receiving the message comprises: receiving, via the message, control information that indicates the PHR, wherein a reserved bit of the control information indicates that the energy information is multiplexed with the PHR.

Aspect 24: The method of any of aspects 16 through 23, wherein receiving the message comprises: receiving, via the message, control information that comprises a first set of one or more bits that indicates an RI associated with the CSI, a second set of one or more bits that indicates a CQI associated with the CSI, and a third set of one or more bits that indicates an energy request, the energy information, or both.

Aspect 25: The method of any of aspects 16 through 24, wherein receiving the message comprises: receiving, via the message, the PHR in accordance with a timer.

Aspect 26: The method of any of aspects 16 through 25, wherein the control signaling indicates to transmit the PHR at a time or during a period of time.

Aspect 27: The method of any of aspects 16 through 26, wherein the energy information comprises a charging rate profile, a discharging rate profile, an energy level profile, or any combination thereof.

Aspect 28: The method of any of aspects 16 through 27, wherein the message comprises a MAC-CE that indicates one or more of the PHR or the CSI.

Aspect 29: An apparatus for wireless communication at an energy harvesting wireless device, comprising at least one processor; and memory coupled with the at least one processor, the memory storing instructions for the at least one processor to cause the energy harvesting wireless device to perform a method of any of aspects 1 through 15.

Aspect 30: An apparatus for wireless communication at an energy harvesting wireless device, comprising at least one means for performing a method of any of aspects 1 through 15.

Aspect 31: A non-transitory computer-readable medium storing code for wireless communication at an energy harvesting wireless device, the code comprising instructions executable by at least one processor to perform a method of any of aspects 1 through 15.

Aspect 32: An apparatus for wireless communication at a network entity, comprising at least one processor; and memory coupled with the at least one processor, the memory storing instructions for the at least one processor to cause the energy harvesting wireless device to perform a method of any of aspects 16 through 28.

Aspect 33: An apparatus for wireless communication at a network entity, comprising at least one means for performing a method of any of aspects 16 through 28.

Aspect 34: A non-transitory computer-readable medium storing code for wireless communication at a network entity, the code comprising instructions executable by at least one processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), IEEE 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at an energy harvesting wireless device, comprising:
at least one processor; and
memory coupled with the at least one processor, the memory storing instructions for the at least one processor to cause the energy harvesting wireless device to:
detect a trigger for transmitting one or more of a power headroom report or channel state information; and
transmit a message comprising one or more of the power headroom report or the channel state information, wherein the message comprises an indication that energy information for the energy harvesting wireless device is multiplexed with one or more of the power headroom report or the channel state information.

2. The apparatus of claim 1, wherein the instructions to transmit the message are for the at least one processor to cause the energy harvesting wireless device to:
transmit, via the message, control information that indicates the power headroom report, wherein one or more reserved bits of the control information indicate a type of the power headroom report.

3. The apparatus of claim 2, wherein the control information comprises a first set of one or more bits that indicate the power headroom report and a second set of one or more bits that indicate an energy request, the energy information, or both, wherein the second set of one or more bits comprises the one or more reserved bits.

4. The apparatus of claim 2, wherein a first reserved bit of the one or more reserved bits indicates an energy request and a second reserved bit of the one or more reserved bits indicates the energy information.

5. The apparatus of claim 4, wherein the energy request comprises a request for additional energy, and the energy information indicates an energy charging status.

6. The apparatus of claim 1, wherein the instructions to transmit the message are for the at least one processor to cause the energy harvesting wireless device to:
transmit, via the message, control information that comprises a first set of one or more reserved bits, a second set of one or more bits that indicate an energy request, the energy information, or both, and a third set of one or more bits that indicate the power headroom report.

7. The apparatus of claim 1, wherein the instructions to transmit the message are for the at least one processor to cause the energy harvesting wireless device to:
transmit, via the message, control information that comprises a first set of one or more reserved bits, a second set of one or more bits that indicate an energy request, the energy information, or both, and a third set of one or more bits that indicate the channel state information.

8. The apparatus of claim 1, wherein the instructions to transmit the message are for the at least one processor to cause the energy harvesting wireless device to:
transmit, via the message, control information that indicates the power headroom report, wherein a reserved bit of the control information indicates that the energy information is multiplexed with the power headroom report.

9. The apparatus of claim 1, wherein the instructions to transmit the message are for the at least one processor to cause the energy harvesting wireless device to:
transmit, via the message, control information that comprises a first set of one or more bits that indicates a rank indicator associated with the channel state information, a second set of one or more bits that indicates a channel quality indicator associated with the channel state information, and a third set of one or more bits that indicates an energy request, the energy information, or both.

10. The apparatus of claim 1, wherein the instructions to detect the trigger are for the at least one processor to cause the energy harvesting wireless device to:
detect one or more changes in the energy information that trigger transmission of the message, wherein the one or more changes are associated with a discharging rate, a charging rate, a pathloss, or any combination thereof.

11. The apparatus of claim 1, wherein the instructions to detect the trigger are for the at least one processor to cause the energy harvesting wireless device to:
detect a change in a discharging rate below a threshold value, a change in a charging rate above or below a threshold value, or both, wherein a pathloss is unchanged, and wherein the changes trigger transmission of the message.

12. The apparatus of claim 1, wherein the instructions to transmit the message are for the at least one processor to cause the energy harvesting wireless device to:
transmit, via the message, the power headroom report in accordance with a timer.

13. The apparatus of claim 1, wherein the instructions to detect the trigger are for the at least one processor to cause the energy harvesting wireless device to:
receive control signaling that triggers transmission of the message, wherein the control signaling indicates to transmit the power headroom report at a time or during a period of time.

14. The apparatus of claim 1, wherein the energy information comprises a charging rate profile, a discharging rate profile, an energy level profile, or any combination thereof.

15. The apparatus of claim 1, wherein the message comprises a medium access control (MAC) control element (MAC-CE) that indicates one or more of the power head-room report or the channel state information.

16. A method for wireless communication at an energy harvesting wireless device, comprising:

detecting a trigger for transmitting one or more of a power headroom report or channel state information; and transmitting a message comprising one or more of the power headroom report or the channel state information, wherein the message comprises an indication that energy information for the energy harvesting wireless device is multiplexed with one or more of the power headroom report or the channel state information.

17. The method of claim 16, wherein transmitting the message comprises:

transmitting, via the message, control information that indicates the power headroom report, wherein one or more reserved bits of the control information indicate a type of the power headroom report.

18. The method of claim 17, wherein the control information comprises a first set of one or more bits that indicate the power headroom report and a second set of one or more bits that indicate an energy request, the energy information, or both, wherein the second set of one or more bits comprises the one or more reserved bits.

19. The method of claim 17, wherein a first reserved bit of the one or more reserved bits indicates an energy request and a second reserved bit of the one or more reserved bits indicates the energy information.

20. The method of claim 19, wherein the energy request comprises a request for additional energy, and the energy information indicates an energy charging status.

21. The method of claim 16, wherein transmitting the message comprises:

transmitting, via the message, control information that comprises a first set of one or more reserved bits, a second set of one or more bits that indicate an energy request, the energy information, or both, and a third set of one or more bits that indicate the power headroom report.

22. The method of claim 16, wherein transmitting the message comprises:

transmitting, via the message, control information that comprises a first set of one or more reserved bits, a second set of one or more bits that indicate an energy request, the energy information, or both, and a third set of one or more bits that indicate the channel state information.

23. The method of claim 16, wherein transmitting the message comprises:

transmitting, via the message, control information that indicates the power headroom report, wherein a reserved bit of the control information indicates that the energy information is multiplexed with the power headroom report.

24. The method of claim 16, wherein transmitting the message comprises:

transmitting, via the message, control information that comprises a first set of one or more bits that indicates a rank indicator associated with the channel state information, a second set of one or more bits that indicates a channel quality indicator associated with the channel state information, and a third set of one or more bits that indicates an energy request, the energy information, or both.

25. The method of claim 16, wherein detecting the trigger comprises:

detecting one or more changes in the energy information that trigger transmission of the message, wherein the one or more changes are associated with a discharging rate, a charging rate, a pathloss, or any combination thereof.

26. The method of claim 16, wherein detecting the trigger comprises:

detecting a change in a discharging rate below a threshold value, a change in a charging rate above or below a threshold value, or both, wherein a pathloss is unchanged, and wherein the changes trigger transmission of the message.

27. The method of claim 16, wherein transmitting the message comprises:

transmitting, via the message, the power headroom report in accordance with a timer.

28. The method of claim 16, wherein detecting the trigger comprises:

receiving control signaling that triggers transmission of the message, wherein the control signaling indicates to transmit the power headroom report at a time or during a period of time.

29. The method of claim 16, wherein the energy information comprises a charging rate profile, a discharging rate profile, an energy level profile, or any combination thereof.

30. The method of claim 16, wherein the message comprises a medium access control (MAC) control element (MAC-CE) that indicates one or more of the power headroom report or the channel state information.

* * * * *